(12) United States Patent
Mendoza

(10) Patent No.: US 12,297,798 B2
(45) Date of Patent: May 13, 2025

(54) KELP-INSPIRED MARINE ENERGY CONVERTER

(71) Applicant: Alliance for Sustainable Energy, LLC, Golden, CO (US)

(72) Inventor: Nicole Renee Mendoza, Longmont, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 0 days.

(21) Appl. No.: 18/601,024

(22) Filed: Mar. 11, 2024

(65) Prior Publication Data

US 2024/0301856 A1 Sep. 12, 2024

Related U.S. Application Data

(60) Provisional application No. 63/489,454, filed on Mar. 10, 2023.

(51) Int. Cl.
*F03B 13/18* (2006.01)

(52) U.S. Cl.
CPC .... *F03B 13/188* (2013.01); *F05B 2280/1021* (2013.01); *F05B 2280/1041* (2013.01); *F05B 2280/1042* (2013.01); *F05B 2280/105* (2013.01); *F05B 2280/20042* (2013.01); *F05B 2280/20043* (2013.01); *F05B 2280/4011* (2013.01)

(58) Field of Classification Search
CPC .................................................. F03B 13/188
See application file for complete search history.

(56) References Cited

U.S. PATENT DOCUMENTS

| | | | | |
|---|---|---|---|---|
| 4,404,490 A * | 9/1983 | Taylor | ..................... | F03B 13/14 310/800 |
| 4,685,296 A * | 8/1987 | Burns | .................. | F03B 13/141 60/497 |
| 5,548,177 A | 8/1996 | Carroll | | |
| 5,578,889 A * | 11/1996 | Epstein | .................... | H02N 2/18 310/329 |
| 6,433,465 B1 * | 8/2002 | McKnight | ................ | H02N 1/00 310/319 |

(Continued)

FOREIGN PATENT DOCUMENTS

| CN | 106555727 B | 6/2022 |
|---|---|---|
| CN | 111355403 A | 4/2023 |

(Continued)

OTHER PUBLICATIONS

Stretchable Piezoelectric Power Generators Based on ZnO Thin Films on Elastic Substrates, Voiculescu et al., 2019 (Year: 2019).*

(Continued)

*Primary Examiner* — Tulsidas C Patel
*Assistant Examiner* — Thomas K Quigley
(74) *Attorney, Agent, or Firm* — Alexandra M Hall

(57) ABSTRACT

A kelp-inspired marine energy converter (MEC) device having a plurality of strips of flexible electroactive materials connected to a power conditioning module and anchored to a structure (such as the ocean floor) is described. The movement of the strips caused by water motion or current action (i.e., water motion) converted by the electroactive material to electrical energy.

15 Claims, 4 Drawing Sheets

(56) References Cited

U.S. PATENT DOCUMENTS

| | | | |
|---|---|---|---|
| 7,199,481 B2* | 4/2007 | Hirsch | F03B 13/1855 290/53 |
| 8,120,195 B2 | 2/2012 | Pollack et al. | |
| 8,274,167 B1* | 9/2012 | Hughes | F03B 13/1885 290/53 |
| 8,633,608 B2 | 1/2014 | Grey et al. | |
| 9,059,605 B2 | 6/2015 | Murray et al. | |
| 9,726,143 B2 | 8/2017 | Wu et al. | |
| 10,514,019 B2* | 12/2019 | Dayson | H02N 2/18 |
| 11,401,910 B2* | 8/2022 | Boren | F03B 13/188 |
| 11,815,060 B2 | 11/2023 | Boren et al. | |
| 2005/0099010 A1 | 5/2005 | Hirsch | |
| 2010/0222452 A1 | 9/2010 | Kawahara | |
| 2011/0006532 A1* | 1/2011 | Grey | F03B 13/148 290/53 |
| 2016/0040648 A1* | 2/2016 | Wang | H02H 1/04 290/42 |
| 2018/0351480 A1* | 12/2018 | Ahmad | H02K 35/04 |
| 2020/0313575 A1 | 10/2020 | Joh et al. | |
| 2021/0054820 A1* | 2/2021 | Boren | F03B 13/182 |
| 2022/0403811 A1* | 12/2022 | Boren | F03B 13/188 |

FOREIGN PATENT DOCUMENTS

| | | |
|---|---|---|
| GB | 2475405 A | 9/2012 |
| KR | 10-2018-0077651 A | 7/2018 |
| WO | 2011/065838 A1 | 6/2011 |

OTHER PUBLICATIONS

A Review of Dielectric Elastomer Generator Systems, Moretti et al., 2020 (Year: 2020).*

"Piezoelectric Ribbon", available at https://www.adafruit.com/product/4931, accessed on May 7, 2024, pp. 1-6.

Jbaily et al., "Piezoelectric devices for ocean energy: a brief survey", Journal of Ocean Engineering and Marine Energy, 2015, vol. 1, pp. 101-118.

International Search Report and Written Opinion for International (PCT) Application No. PCT/US24/19351, date of mailing Jun. 26, 2024, pp. 1-11.

* cited by examiner

KELP-INSPIRED MARINE ENERGY CONVERTER

CROSS-REFERENCE TO RELATED APPLICATIONS

This application claims priority to U.S. Provisional Patent Application No. 63/489,454 filed on Mar. 10, 2023, the contents of which are incorporated herein by reference in their entirety.

CONTRACTUAL ORIGIN

This invention was made with United States government support under Contract No. DE-AC36-08GO28308 awarded by the U.S. Department of Energy. The United States government has certain rights in this invention.

BACKGROUND

Most ocean wave energy conversion technologies are extremely large, mostly rigid, monolithic structures that usually harness one type of current energy (e.g., surging, heaving, etc.) using a single power take-off system. Many traditional wave energy conversion technologies include rotating machinery or components, which can be damaged by entanglement, over-speeding, debris collisions, and/or tip-to-tower strikes. Thus, there remains a need for flexible, lightweight, and relatively durable marine energy converters.

SUMMARY

An aspect of the present disclosure is a device for generating electrical energy from a water motion, the device including a strip having a first end and a second end, and a power conditioning module connected to the first end, in which the strip comprises an electroactive material and a conductive material, and the device is configured to generate electrical energy when exposed to water motion through a movement of the electroactive material in response to the water motion. In some embodiments, the device also includes at least one buoyancy device. In some embodiments, the buoyancy device includes at least one of a gas, cork, foam, or sponge. In some embodiments, the device also includes an anchor connected to the first end, in which the anchor connects the device to a structure. In some embodiments, the structure includes at least one of a rock, an ocean floor, a post, a column, or a coral. In some embodiments, the structure includes at least one of a substrate, backing, mesh, mooring line, a buoy, or a floating solar device. In some embodiments, the device also includes a protective material positioned around the strip. In some embodiments, the protective material comprises at least one of polypropylene (PP), polyethylene (PE), polyvinyl chloride (PVC), or silicone. In some embodiments, the power conditioning module includes at least one of a rectifier, diode, transformer, inverter, or power converter. In some embodiments, the strip is configured to generate an alternating current (AC), and the power conditioning module is configured to convert the AC to a direct current (DC). In some embodiments, the electroactive material includes at least one of polyvinylidene fluoride (PVDF), lead zirconate titanate (PZT), or zinc oxide. In some embodiments, the conductive material includes at least one of copper, gold, tin, or silver. In some embodiments, the mesh includes at least one of a natural fiber, nylon, polyester, twine, polypropylene, or polyethylene.

An aspect of the present disclosure is a system including: a first device for generating an electrical energy from a water motion, a second device for generating the electrical energy from the water motion, and a mesh, in which: the first device includes: a first strip having a first end and a second end, and a first power conditioning module connected to the first end, in which the first strip includes an electroactive material and a conductive material, and the first device is configured to generate the electrical energy when exposed to the water motion through the movement of the electroactive material, the second device includes: a second strip having a third end and a fourth end, and a second power conditioning module connected to the third end, in which the second strip comprises an electroactive material and a conductive material, and the second device is configured to generate the electrical energy when exposed to the water motion through the movement of the electroactive material, the mesh is connected to the first end and the third end, and the mesh is connected to a structure. In some embodiments, the first device also includes at least one buoyancy device. In some embodiments, the buoyancy device includes at least one of a gas, cork, foam, or sponge. In some embodiments, the first strip is configured to generate an alternating current (AC), and the first power conditioning module is configured to convert the AC to a direct current (DC). In some embodiments, the electroactive material includes at least one of polyvinylidene fluoride (PVDF), lead zirconate titanate (PZT), or zinc oxide. In some embodiments, the conductive material includes at least one of copper, gold, silver, or tin. In some embodiments, the mesh includes at least one of a natural fiber, nylon, polyester, twine, polypropylene, or polyethylene.

BRIEF DESCRIPTION OF THE DRAWINGS

Some embodiments of the present disclosure are illustrated in the referenced figures of the drawings. It is intended that the embodiments and figures disclosed herein are to be considered illustrative rather than limiting.

REFERENCE NUMERALS

Figure 1:
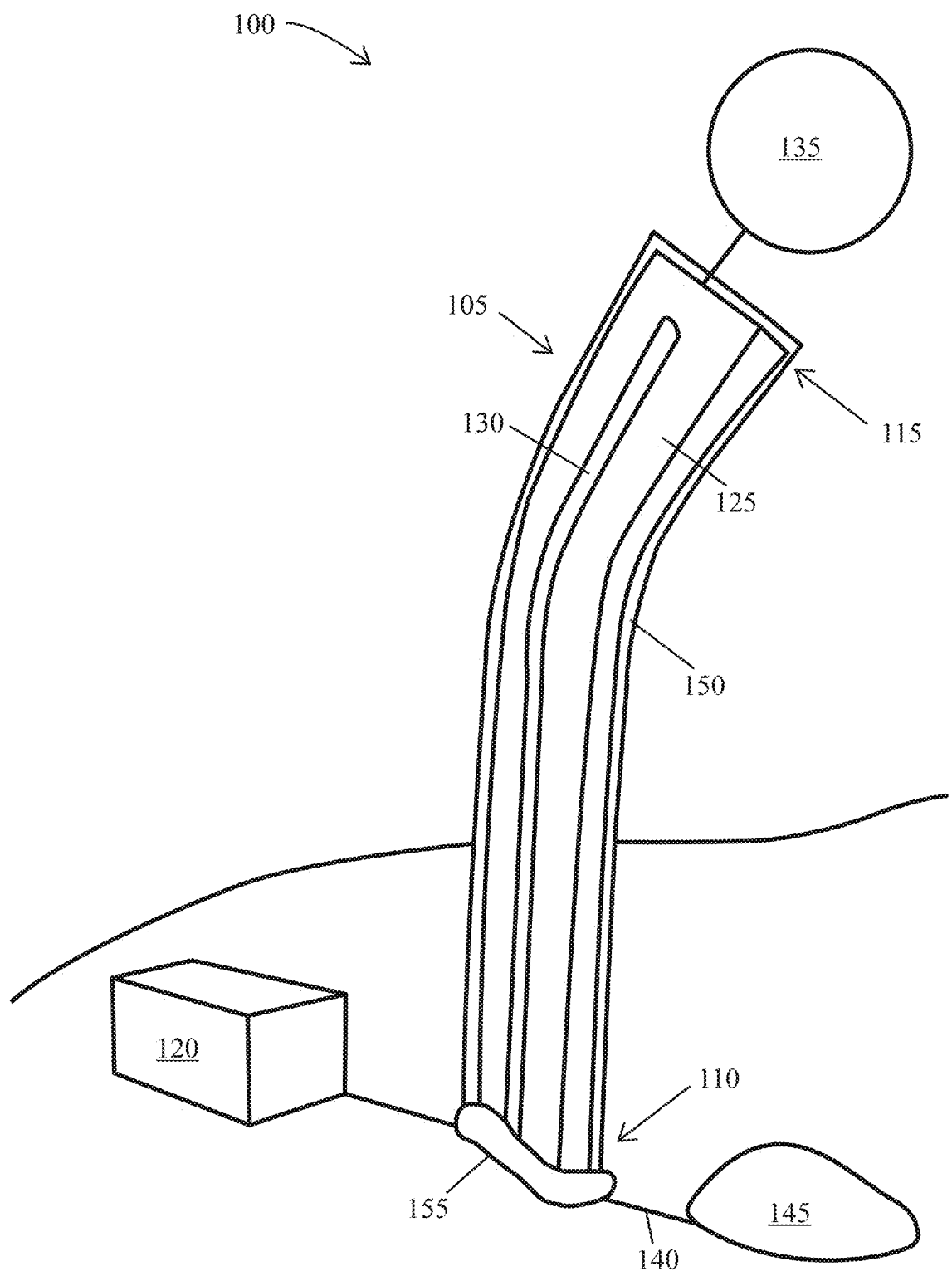
FIG. 1 illustrates an electroactive marine energy converter (MEC), according to some aspects of the present disclosure.

100 . . . device
105 . . . strip
110 . . . first end
115 . . . second end
120 . . . power conditioning module
125 . . . electroactive material
130 . . . conductive material
135 . . . buoyancy device
140 . . . anchor
145 . . . structure
150 . . . protective material 155 . . . sealant
200 . . . system
205 . . . mesh

DETAILED DESCRIPTION

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

Among other things, the present disclosure relates to a kelp-inspired marine energy converter (MEC) device having a plurality of strips of flexible electroactive materials connected to a power conditioning module and anchored to a structure (such as the ocean floor). The movement of the strips caused by water motion or current action (i.e., water motion) converted by the electroactive material to electrical energy.

Note that electroactive MEC device of the present disclosure may be utilized in any aquatic environment, such as under the ocean (at various depths ranging from substantially shallow to the deep sea), rivers, streams, or lakes. As described herein, the electroactive MEC device may be attached to the floor or bed of the aquatic environment it is operated in, a natural feature of the aquatic environment, a man-made feature of the aquatic environment, or an object that is capable of movement (either active or by floating) throughout the aquatic environment (at the surface level or submerged).

FIG. 1 illustrates a kelp-inspired MEC device 100, according to some aspects of the present disclosure. A MEC device 100 may include at least one strip 105 which has a first end 110 and a second end 115. The strip 105 may be made of an electroactive material 125 and a conductive material 130. A buoyancy device 135 may be connected to the second end 115. A power conditioning module 120 may be connected to the first end 110. An anchor 140 may connect the first end 110 to a structure 145. A protective material 150 may be positioned around the strip 105. A sealant 155 may connect the protective material 150 to the strip 105.

In some embodiments, the strip 105 may be designed to mimic the appearance of sea grass or kelp. The strip 105 may be substantially planar. In some embodiments, the strip 105 may have a length (i.e., the distance between the first end 110 and the second end 115) in the range of about 6 inches to about 5 feet (60 inches) and a width in the range of about 0.5 inch to about 12 inches. In some embodiments, the strip 105 may have a width in the range of approximately 0.5 inch to approximately 3.5 inches. The strip 105 may have a thickness in the range of about 10 μm to about 500 μm. In some embodiments, the strip 105 may have a thickness in the range of about 50 μm to about 150 μm.

In some embodiments, a MEC device 100 may have more than one strip 105 connected to a single power conditioning module 120 and/or a single anchor 140. In some embodiments, a single MEC device 100 may have two (2), three (3), four (4), five (5), six (6), seven (7), eight (8), nine (90, ten (10) or more strips 105. In some embodiments, the strip 105 may have branches (i.e., not be substantially rectangular) and the electroactive material 125 and/or the conductive material 130 may not be in a single linear orientation but may have multiple sections all originating from the first end 110.

In some embodiments, the strip 105 may include a substantially electroactive material 125 (i.e., a material capable of converting mechanical stress/movement to electrical energy). The electroactive material 125 may be substantially planar and substantially rectangular. Exemplary electroactive materials 125 include piezoelectric materials such as at least one of polyvinylidene fluoride (PVDF), lead zirconate titanate (PZT), or zinc oxide. In some embodiments, the electroactive material 125 may include elastomer generators, dielectric elastomer generators, or magnetostrictive generators. In some embodiments, the electroactive material 125 may be substantially poled (i.e., have a positive surface and a negative surface).

In some embodiments, the strip 105 may also include a conductive material. The conductive material may be substantially planar and rectangular or may be substantially cylindrical. Exemplary conductive materials 130 may include at least one of copper, gold, tin, or silver. The electroactive material 125 and the conductive material 130 may be substantially parallel along the strip 105. In some embodiments, the conductive material 130 may include a first electrode and a second electrode. In some embodiments, the first electrode may be connected to the positive surface of the electroactive material and the second electrode may be connected to the negative surface of the electroactive material.

In some embodiments, each strip may be connected to at least one buoyancy device 135. A buoyancy device 135 may be made of a material that is substantially less dense than water. In some embodiments, the buoyancy device 135 may be substantially hollow (i.e., filled with a gas, such as at least one of air, nitrogen, helium, oxygen, or argon). Exemplary buoyancy devices include a ping pong ball, a cork, foam, or a sponge. Buoyancy devices 135 may be connected to the strips 105 at various points along the length of an individual strip. In some embodiments, the buoyancy device 135 may be located at or near the second end 115.

Figure 2:
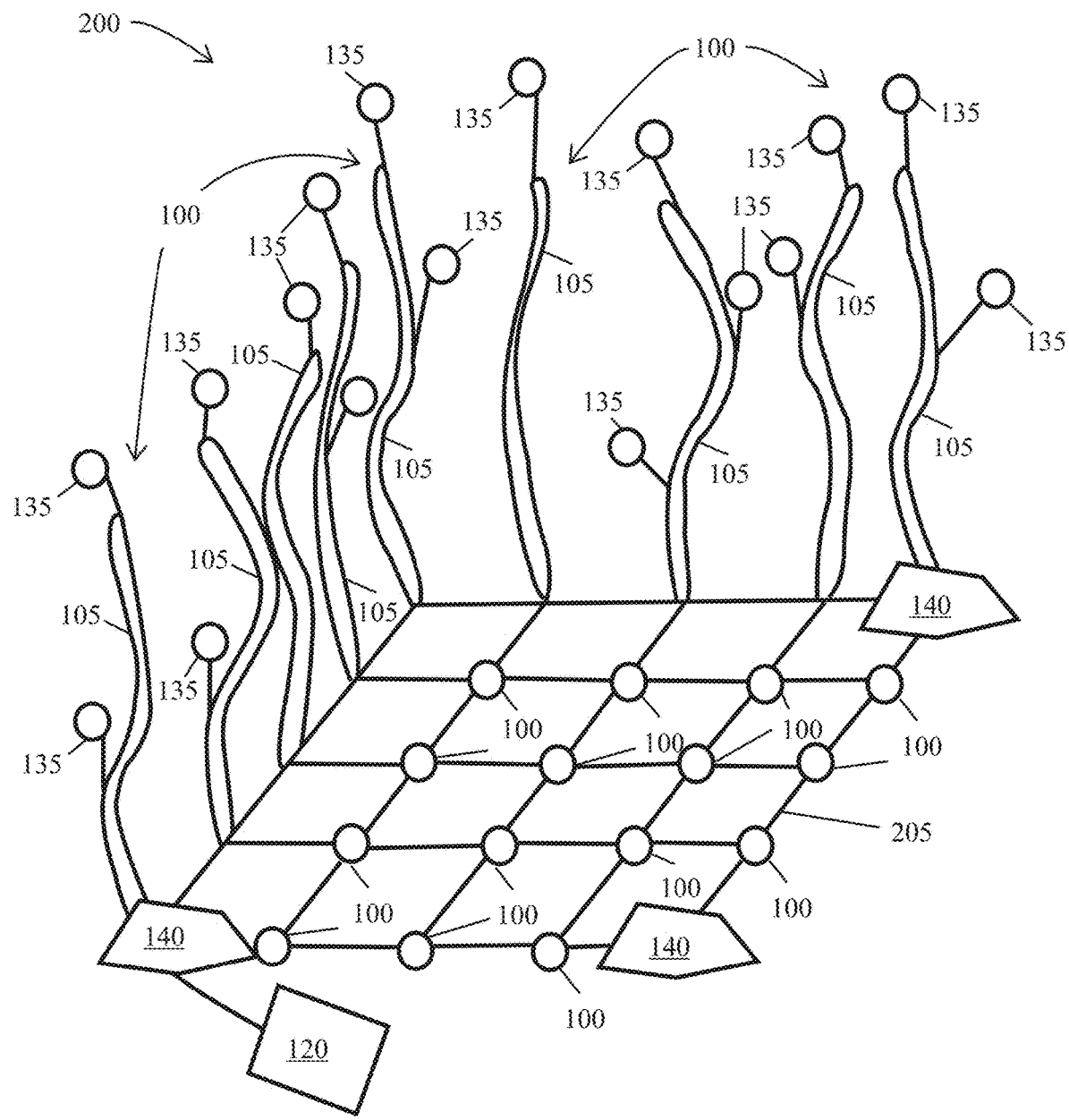
FIG. 2 illustrates a system of a plurality of electroactive MECs, according to some aspects of the present disclosure.

In some embodiments, the first end 110 may be connected to an anchor 140. The anchor 140 may be a wire, tether, rope, chain, or other mooring device which connects the MEC device 100 to a structure 145. In some embodiments, the structure 145 may be substantially stationary, such as a rock, the ocean floor, a post, a column, or coral. In some embodiments, the structure 145 may be floating on the water, suspended in the water (i.e., at least partially submerged), and/or connected to a solid object, but still capable of some movement, such as a mooring line, a buoy, a floating solar device or other sensor/instrument, or autonomous underwater vehicle (AUV). The MEC device 100 may be connected to a variety of submerged or partially submerged structures 145, for example, a pier, a dock, a floating solar cell, a mooring line, a buoy, the ocean floor, an AUV recharging station, an electric boat charging station, an AUV, an offshore fixed-bottom wind turbine, an offshore floating wind turbine, an offshore oil and gas platform, coral, an artificial reef structure, a rock, or other submerged structure. In some embodiments, the anchor 140 may be connected to a mesh 205 (as shown in FIG. 2). In some embodiments, the anchor 140 may have a length between the structure 145 and the strip 105. The length may be in the range of about 0.5 inches to about 5 feet (60 inches).

In some embodiments, a power conditioning module 120 may be connected to the first end 110 of the electroactive MEC 100. The power conditioning module 120 may be at least one of a rectifier, diode, transformer, inverter, or power converter. The electroactive material 125 of the electroactive MEC 100 is capable of converting movement (i.e., kinetic energy) into electrical energy, but the resulting electrical energy may be in the form of an alternating current (DC). The power conditioning module 120 may be capable of converting the AC power to direct current (DC). In some embodiments, the power conditioning module 120 may also include an energy storage capability, such as a battery, fuel cell, or energy storage media.

In some embodiments, the strip 105 may be surrounded by a protective material 150. Exemplary protective materials include at least one of polypropylene (PP), polyethylene (PE), polyvinyl chloride (PVC), or silicone. In some embodiments, the protective material 150 may substantially enclose, surround, or envelop the strip 105. The protective material 150 may substantially watertight around the strip 105.

In some embodiments, the protective material 150 may be connected to the electroactive material 125 and the conductive material 130 using a sealant 155. Exemplary sealant 155 materials include a plastic bond, Loctite marine caulk, epoxy, vacuum sealant tape, silicone caulk, rubber cement, and/or a glue or heat gun paste. The sealant 155 may assist the protective material 150 in creating a substantially watertight seal around the strip 105. The sealant 155 may connect the electroactive material 125, conductive material, and/or protective material 150 together.

FIG. 2 illustrates a system 200 of a plurality of electroactive MECs 100, according to some aspects of the present disclosure. A group of electroactive MECs 100 may be connected using a mesh 205. In FIG. 2, not all electroactive MECs 100 are shown in detail, some are indicated by a circle labeled as the electroactive MEC 100. This was to avoid a chaotic image. A weight (not shown) may be connected to the mesh 205 to act as an anchor 140 for the system 200.

In some embodiments, water motion/movement may result in nutrients being "trapped" or more concentrated around the strips 105 and/or mesh 205. For example, the mesh 205 may accumulate sediment on the ocean floor. In some embodiments, a system 200 including a plurality of electroactive MECs 100 connected by a mesh 205 may be utilized for both electrical energy generation and erosion control/sediment control. When a plurality of electroactive MECs are connected to a mesh, they may be arranged in a substantially grid-like formation, circular formation, or other geographic 1-D (i.e., a line) or 2-D (i.e., a grid) orientation.

In some embodiments, the mesh 205 may be a netting, fabric, or other substantially flexible material. The mesh 205 may be made of a natural fiber, nylon, polyester, twine, polypropylene, polyethylene, yarn, wire, stainless steel, or other material. The mesh 205 may connect multiple electroactive MECs 100 to each other and to at least one structure 205. In some embodiments, the mesh 205 may contain a wire or other means of electrically connecting the electroactive MECs 100 to at least one power conditioning module 120.

In some embodiments, the weight (not shown) connected to the mesh 205 may be made of iron, steel, stainless steel, plastic, rubber, cement, gravel, and/or another material that is substantially denser than water. The weight and/or the anchor 140 may serve to keep the mesh 205 from being moved significantly by water movement, allowing the mesh 205 to remain substantially stationary while the strips 105 are moved by water movement. In some embodiments, the structure 145 may be the weight.

Figure 3A:
FIG. 3A illustrates a plurality of electroactive MECs including buoyancy devices and FIG. 3B illustrates an exemplary single electroactive MEC having a buoyancy device, according to some aspects of the present disclosure.
Figure 3B:
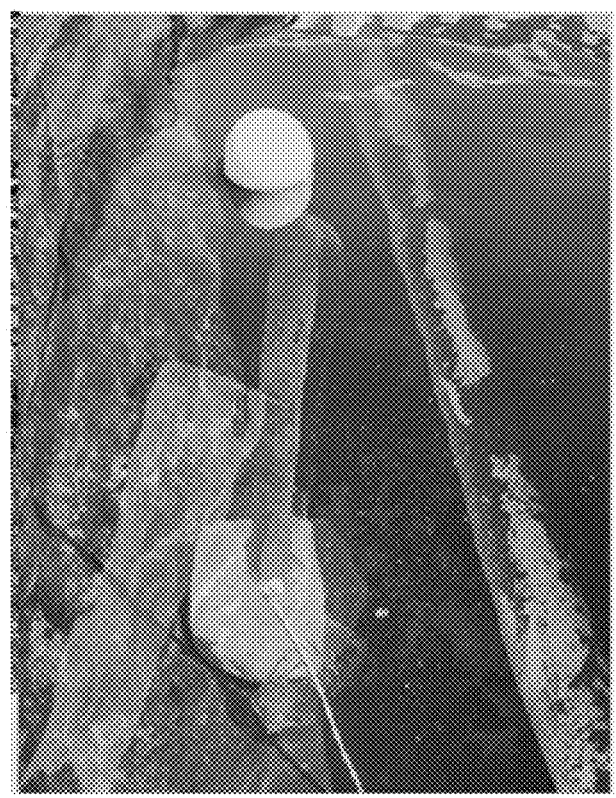

FIG. 3A illustrates a system 200 including a plurality of strips 105 and buoyancy devices 135 and FIG. 3B illustrates an electroactive MEC 100 having a single strip 105 having a single buoyancy device 135, according to some aspects of the present disclosure. As shown in FIG. 3A, a single strip 105 may be connected to any number of buoyancy devices 135, in the range of one (1) to ten (10) positioned along the length of the strip 105. The images as shown in FIG. 3A-B show exemplary systems 200 and electroactive MECs 100 as used for testing. Each exemplary electroactive MECs 100 as shown in FIG. 3A-B was made using a strip 105 of an electroactive material of polyvinylidene fluoride (PVDF) and a conductive material of copper (Cu). The buoyancy devices 135 in FIG. 3A-B were substantially hollow and substantially spherical (i.e., ping pong balls). The electroactive MECs 100 were connected to a power conditioning module 120 of an inverter.

Figure 4:
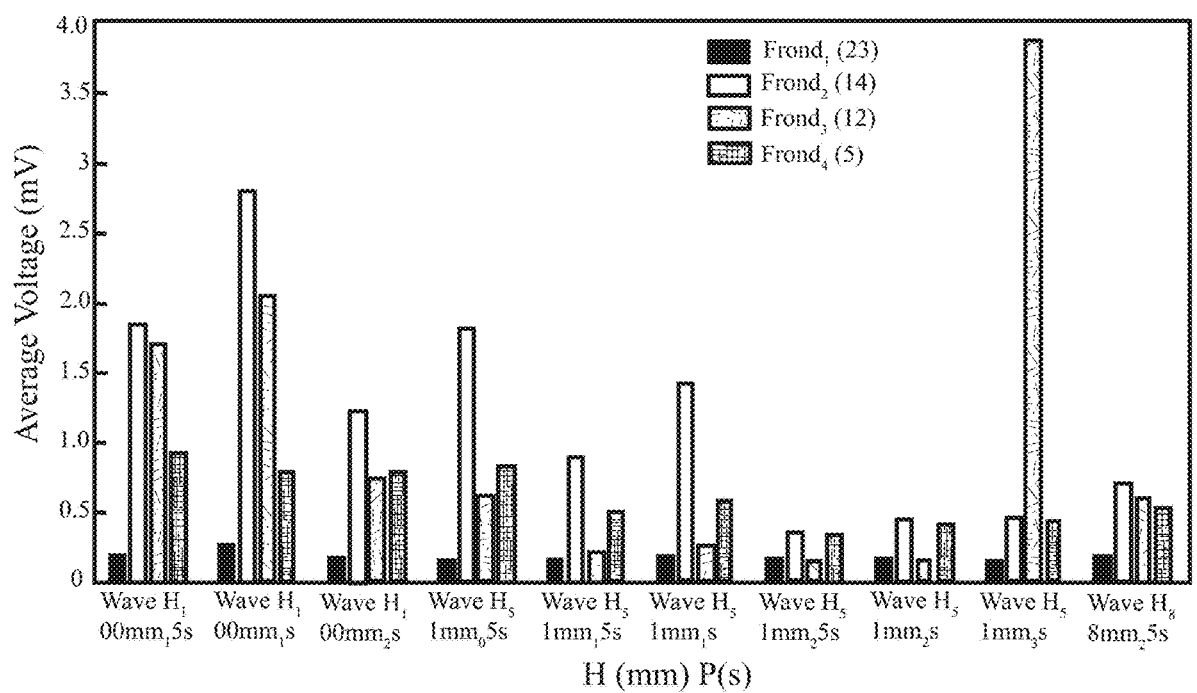
FIG. 4 illustrates measured voltage generation in response to water motion for four exemplary electroactive MECs, according to some aspects of the present disclosure.

FIG. 4 illustrates measured average voltage generation in response to water motion for four exemplary electroactive MECs 100, according to some aspects of the present disclosure. The four electroactive MECs 100 shown in FIG. 4 include: $Frond_1(23)$ which was approximately 44 inches long, $Frond_2(14)$ which was approximately 68 inches long, $Frond_3(12)$ which was approximately 52 inches long, and $Frond_4(5)$ which was approximately 60 inches long. The electroactive MECs 100 tested for the results in FIG. 4 included an electroactive material 125 of polyvinylidene fluoride (PVDF) and a conductive material 130 of copper (Cu). The results shown in FIG. 4 demonstrate that electrical energy (as measured in mV) was generated by the electroactive MECs 100 when exposed to different wave heights (measured in mm) and periods (as measured in seconds) as shown on the x-axis. The voltage shown in FIG. 4 may be generated by the electroactive MEC 100 from wave movement on the electroactive material 125 and the conductive material 130 creating electrical energy in the form of alternating current (AC) and the power conditioning module 120) receiving the AC electrical energy and converting it to direct current (DC).

In some embodiments, the electroactive MEC 100 may be manufactured by first cutting the electroactive material 125 into its desired shape (including length, width, and/or thickness). Next, the conductive material 130 may be adhered (using the sealant 155 or any adhered manufacturing process or method) to both the first (i.e., positive) surface and the second (i.e., negative) surface of the electroactive material 125. In some embodiments, the conductive material 130 may be substantially equivalent in length to the electroactive material 125. Next, a positive wire may be attached (e.g., soldered) to the first electrode and a negative wire may be attached to the second electrode. The positive and negative wires may be of substantially the same material as the conductive material 130 or may be an electrical wire. Next, the strip 105 of both the electroactive material 125 and the conductive material 130 may be coated (via submersion, applying/painting, deposition, and/or other means) with the protective material 150. Any gaps, joints, edges, seams, or other desired portions of the protective material may be further made substantially watertight by applying the sealant 155. Next, the electroactive MEC 100 may be tested by attaching the first electrode and the second electrode (and their respective wires) to a voltage measurement device (e.g., a voltmeter, a multimeter, or an oscilloscope), manually stimulating the electroactive MEC 100, and verifying the electrical output. Finally, the protective material 150 and sealant 155 may be tested by submerging the electroactive MEC 100 in water and monitoring for air bubbles, then removing the electroactive MEC 100 and checking for any water located inside the electroactive MEC 100.

EXAMPLES

Example 1. A device for generating electrical energy from a water motion, the device comprising:
a strip having a first end and a second end; and
a power conditioning module connected to the first end; wherein:
the strip comprises an electroactive material and a conductive material, and
the device is configured to generate electrical energy when exposed to water motion through a movement of the electroactive material in response to the water motion.

Example 2. The device of Example 1, further comprising: at least one buoyancy device.

Example 3. The device of Example 2, wherein: the buoyancy device is located at or near the second end.

Example 4. The device of Example 2, wherein: the buoyancy device comprises a material that is substantially less dense than water.

Example 5. The device of Example 4, wherein: the material comprises at least one of air, cork, foam, or sponge.

Example 6. The device of Example 1, further comprising: an anchor connected to the first end.

Example 7. The device of Example 6, wherein: the anchor connects the device to a structure.

Example 8. The device of Example 7, wherein: the structure comprises at least one of a rock, an ocean floor, a post, a column, or a coral.

Example 9. The device of Example 7, wherein: the structure comprises at least one of a mooring line, a buoy, or a floating solar device.

Example 10. The device of Example 1, wherein: the strip is substantially planar.

Example 11. The device of Example 1, further comprising: a protective material positioned around the strip.

Example 12. The device of Example 11, wherein:
the protective material comprises at least one of polypropylene (PP), polyethylene (PE), polyvinyl chloride (PVC), or silicone.

Example 13. The device of Example 1, wherein:
the power conditioning module comprises at least one of a rectifier, diode, transformer, inverter, or power converter.

Example 14. The device of Example 1, wherein:
the strip is configured to generate an alternating current (AC), and the power conditioning module is configured to convert the AC to a direct current (DC).

Example 15. The device of Example 1, wherein:
the electroactive material comprises at least one of polyvinylidene fluoride (PVDF), lead zirconate titanate (PZT), or zinc oxide.

Example 16. The device of Example 1, wherein:
the conductive material comprises at least one of copper, gold, or silver.

Example 17. The device of Example 1, wherein:
the conductive material comprises a first electrode and a second electrode,
the first electrode comprises a first wire, and
the second electrode comprises a second wire.

Example 18. The device of Example 17, wherein:
the first wire and the second wire comprise at least one of copper, gold, or silver Example 19. A system comprising:
a first device for generating an electrical energy from a water motion;
a second device for generating the electrical energy from the water motion; and
a mesh; wherein:
the first device comprises:
a first strip having a first end and a second end; and
a first power conditioning module connected to the first end; wherein:
the first strip comprises an electroactive material and a conductive material, and
the first device is configured to generate the electrical energy when exposed to the water motion through the movement of the electroactive material,
the second device comprises:
a second strip having a third end and a fourth end; and
a second power conditioning module connected to the third end; wherein:
the second strip comprises an electroactive material and a conductive material, and
the second device is configured to generate the electrical energy when exposed to the water motion through the movement of the electroactive material,
the mesh is connected to the first end and the third end, and
the mesh is connected to a structure.

Example 20. The system of Example 19, wherein:
the structure comprises at least one of a rock, an ocean floor, a post, a column, or a coral.
Example 21. The system of Example 19, wherein:
the structure comprises at least one of a mooring line, a buoy, or a floating solar device.
Example 22. The system of Example 19, wherein:
the first device further comprises:
at least one buoyancy device located at or near the second end.
Example 23. The system of Example 22, wherein:
the buoyancy device comprises a material that is substantially less dense than water.
Example 24. The system of Example 23, wherein:
the material comprises at least one of air, cork, foam, or sponge.
Example 25. The system of Example 19, wherein:
the first strip is substantially planar.
Example 26. The system of Example 19, wherein:
the first device further comprises:
a protective material positioned around the first strip.
Example 27. The system of Example 26, wherein:
the protective material comprises at least one of polypropylene (PP), polyethylene (PE), polyvinyl chloride (PVC), or silicone.
Example 28. The system of Example 19, wherein:
the first power conditioning module comprises at least one of a rectifier, diode, transformer, inverter, or power converter.
Example 29. The system of Example 19, wherein:
the first strip is configured to generate an alternating current (AC), and
the first power conditioning module is configured to convert the AC to a direct current (DC).
Example 30. The system of Example 13, wherein:
the electroactive material comprises at least one of polyvinylidene fluoride (PVDF), lead zirconate titanate (PZT), or zinc oxide.
Example 31. The system of Example 19, wherein:
the conductive material comprises at least one of copper, gold, silver, or aluminum.
Example 32. The system of Example 19, wherein:
the conductive material comprises a first electrode and a second electrode,
the first electrode comprises a first wire, and
the second electrode comprises a second wire.
Example 33. The system of Example 32, wherein:
the first wire and the second wire comprise at least one of copper, gold, silver, or aluminum.
Example 34. The system of Example 19, wherein:
the first strip has a length between the first end and the second end, and
the first electrode and the second electrode are substantially parallel to the length.
Example 35. The system of Example 19, wherein:
the mesh comprises at least one of nylon, polyester, twine, polypropylene, or polyethylene.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A device for generating electrical energy from a water motion, the device comprising:
   a strip having a first end, a length, and a second end;
   a first buoyancy device connected to the second end;
   a second buoyancy device connected to the length; and
   a power conditioning module; wherein:
   the strip, the first buoyancy device, the second buoyancy device, and the power conditioning module are submerged;
   the strip comprises an electroactive material, a first electrode, and a second electrode,
   the electroactive material comprises a positive surface and a negative surface,
   the first electrode is connected to the positive surface,
   the second electrode is connected to the negative surface,
   the electroactive material comprises at least one of polyvinylidene fluoride (PVDF), lead zirconate titanate (PZT), or zinc oxide,
   the first electrode and the second electrode are connected to the power conditioning module, and
   the device is configured to generate electrical energy when exposed to the water motion through a movement of the electroactive material in response to the water motion.

2. The device of claim 1, wherein:
   the first buoyancy device comprises a hollow sphere.

3. The device of claim 1, further comprising:
   an anchor connected to the first end, wherein:
   the anchor connects the device to a structure.

4. The device of claim 3, wherein:
   the structure comprises at least one of a rock, an ocean floor, a post, a column, or a coral.

5. The device of claim 3, wherein:
   the structure comprises at least one of a mooring line, a buoy, or a floating solar device.

6. The device of claim 1, further comprising:
   a protective material positioned around the strip.

7. The device of claim 6, wherein:
   the protective material comprises at least one of polypropylene (PP), polyethylene (PE), polyvinyl chloride (PVC), or silicone.

8. The device of claim 1, wherein:
   the power conditioning module comprises at least one of a rectifier, diode, transformer, inverter, or power converter.

9. The device of claim 1, wherein:
   the strip is configured to generate an alternating current (AC), and
   the power conditioning module is configured to convert the AC to a direct current (DC).

10. The device of claim 1, wherein:
the first electrode and the second electrode comprise at least one of copper, gold, or silver.

11. A system comprising:
a first device for generating an electrical energy from a water motion;
a second device for generating the electrical energy from the water motion; and
a mesh; wherein:
the first device comprises:
   a first strip having a first end, a first length, and a second end;
   a first buoyancy device connected to the second end;
   a second buoyancy device connected to the first length; and
   a first power conditioning module; wherein:
the first device is submerged,
the first strip comprises a first electroactive material, a first electrode, and a second electrode,
the first electroactive material comprises a positive surface and a negative surface,
the first electrode is connected to the positive surface,
the second electrode is connected to the negative surface,
the first electroactive material comprises at least one of polyvinylidene fluoride (PVDF), lead zirconate titanate (PZT), or zinc oxide,
the first electrode and the second electrode are connected to the power conditioning module, and
   the first device is configured to generate the electrical energy when exposed to the water motion through the movement of the electroactive material,
the second device comprises:
   a second strip having a third end, a second length, and a fourth end;
   a third buoyancy device connected to the fourth end;
   a fourth buoyancy device connected the second length; and
   a second power conditioning module; wherein:
the second is submerged,
the second strip comprises a second electroactive material, a third electrode, and a fourth electrode,
the second electroactive material comprises a positive surface and a negative surface,
the third electrode is connected to the positive surface,
the fourth electrode is connected to the negative surface,
the second electroactive material comprises at least one of polyvinylidene fluoride (PVDF), lead zirconate titanate (PZT), or zinc oxide,
the third electrode and the fourth electrode are connected to the power conditioning module, and
   the second device is configured to generate the electrical energy when exposed to the water motion through the movement of the electroactive material,
the mesh is connected to the first end and the third end, and
the mesh is connected to at least one of a rock, an ocean floor, a post, a column, or a coral.

12. The system of claim 11, wherein:
the first buoyancy device comprises a hollow sphere.

13. The system of claim 11, wherein:
the first strip is configured to generate an alternating current (AC), and
the first power conditioning module is configured to convert the AC to a direct current (DC).

14. The system of claim 11, wherein:
the first electrode and the second electrode comprise at least one of copper, gold, silver, or aluminum.

15. The system of claim 11, wherein:
the mesh comprises at least one of nylon, polyester, twine, polypropylene, or polyethylene.

* * * * *